Patented Nov. 7, 1939

2,178,830

UNITED STATES PATENT OFFICE 2,178,830

AROMATIC POLYALKYLENE ETHER SULPHONATES

Herman A. Bruson, Philadelphia, Pa., assignor to Röhm & Haas Company, Philadelphia, Pa.

No Drawing. Application April 26, 1938, Serial No. 204,306

16 Claims. (Cl. 260—512)

This invention relates to new capillary-active compounds useful as wetting, dispersing, emulsifying and cleansing agents which are water-soluble sulfonates having in the acid form the general formula

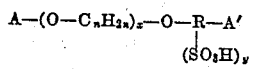

in which A is an aliphatic or cycloaliphatic hydrocarbon group, A' is hydrogen or an aliphatic, cycloaliphatic, aromatic, arylaliphatic hydrocarbon or alkoxy group, R is an aromatic nucleus of the benzene, naphthalene, anthracene, phenanthrene or other condensed ring series, $C_nH_{2n}$ is short chain alkylene radical having at least two carbon atoms, $x$ is an integer of 1 to 5 inclusive and $y$ is 1 or 2. The total number of aliphatic carbon atoms in groups A and A' should be at least four. Thus, if A is an aliphatic hydrocarbon group containing four or more carbon atoms, A' may be hydrogen but is not necessarily so. If, on the other hand, A contains less than four carbon atoms, then A' must be an aliphatic or cycloaliphatic hydrocarbon radical containing at least enough aliphatic carbon atoms so that the total of such carbon atoms in A and A' is at least four. This is necessary in order to maintain the balance between lipophilic and hydrophilic groups required for imparting capillary activity to the final product.

In the foregoing formula A may represent such groups as ethyl, propyl, butyl, amyl, hexyl, octyl, dodecyl, tetradecyl, hexadecyl, octadecyl, oleyl, or cycloaliphatic groups such as butyl-cyclohexyl, octyl-cyclohexyl, lauryl-cyclohexyl, cetyl-cyclohexyl, etc. or other alkyl group containing up to 30 carbon atoms; or bornyl, decahydronaphthyl, abietyl, tetrahydroabietyl or other terpenic radical or naphthenic radical. The alkyl groups mentioned above may have straight or branched chains and the —O—$C_nH_{2n}$-group of the formula may be attached to a primary, secondary or tertiary carbon atom. A may also represent unsaturated groups corresponding to the saturated groups enumerated. A' may represent hydrogen, an alkyl group such as ethyl, butyl, amyl and the other alkyl and cycloalkyl groups represented by A or it may represent an aromatic or aryl aliphatic hydrocarbon group such as phenyl, benzyl, phenylethyl, phenylisobutyl and the like.

The alkylene group represented by —$C_nH_{2n}$— contains at least two carbon atoms and may be a straight or branched chain radical such as are represented by the formulas:

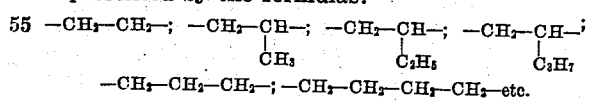

$n$ being an integer of from 2 to 5.

The new compounds provided by the present invention may be prepared in either of the following ways:

(a) An aliphatic, cycloaliphatic or terpenic alcohol whose hydrocarbon radical corresponds to A in the formula may be condensed with an aromatic alkylene ether halide having the formula

in which X is a halogen atom, in the presence of an alkali metal oxide or hydroxide so as to split out alkali metal halide; or the alkali alcoholate of the alcohol A—OH may be condensed directly with the aromatic alkylene ether halide, again splitting out the alkali metal halide. The product thus obtained is then sulfonated by means of any of the usual sulfonating agents and, if desired, converted to any of its metal or organic base salts such as those of the alkali or alkaline earth metals, the primary, secondary or tertiary amines, for example, the methyl amines, ethyl and ethanol amines, pyridine, piperidine, etc.

(b) A phenolic compound corresponding to the formula

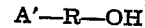

may be condensed with an aliphatic of cycloaliphatic alkylene ether halide

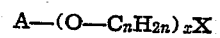

in the presence of an alkali so as to split out the alkali metal halide. These products may also be sulfonated, and the sulfonic acids obtained converted to salts of various bases as described under (a).

In either of the foregoing methods the aromatic radical may be sulfonated prior to condensation but in such cases it will, of course, be necessary to neutralize the sulfonic acid before it can be condensed in an alkaline solution with the halogenated compound.

The sulfonic acids obtained by this process, as well as the alkali metal and alkaline earth metal salts, and the salts of the organic bases are all soluble in water. They can, therefore, be used as wetting, emulsifying, dispersing and cleansing agents in acid, neutral or basic aqueous solutions and also in hard water.

The following examples will serve to illustrate the invention which, however, is not limited to the exact materials and modes of operation shown as it may otherwise be practiced within the scope of the appended claims.

Example 1

In a vessel fitted with an efficient stirrer and reflux condenser a mixture consisting of 100 g. of β-phenoxy-β'-chlorodiethyl ether,

93 g. of lauryl alcohol and 30.8 g. of potassium hydroxide was heated with rapid agitation for 15 hours at 240 to 245° C. The product was cooled and filtered. The precipitate of potassium chloride was washed with alcohol and the washings combined with the filtrate and distilled in vacuo. The fraction boiling at 200-225° C./2 mm. was collected as crude β-phenoxy-β'-lauryloxydiethyl ether having the formula

C₆H₅—O—CH₂CH₂—O—CH₂CH₂—O—C₁₂H₂₅

It was a colorless oil which, on redistillation, boiled at 210-220° C./2-3 mm. The yield was 117 g.

The material was sulfonated by treating 35 g. dissolved in 35 g. of ethylene dichloride with 23.2 g. of chlorsulfonic acid at 5 to 15° C. for 24 hours, with stirring. The dark oil was neutralized with dilute caustic soda and evaporated to dryness. The product was a white mass which was readily soluble in water to give a foamy, soap-like solution. It gave no precipitate with calcium chloride solution, and can be used in hard water as a dispersing, emulsifying or wetting agent.

*Example 2*

A mixture consisting of 156 g. of p-α, α, γ, γ-tetramethyl-butylphenoxy-ethoxyethyl chloride, 93 g. of lauryl alcohol, and 22 g. of sodium hydroxide was heated for 7 hours at 190 to 200° C., as described in Example 1. The desired product, boiling at 250-265° C./3 mm., was collected as a colorless oil having the formula:

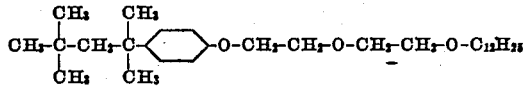

46.2 g. of this compound was sulfonated at 15 to 25° C. for 3 hours in 50 g. of ethylene dichloride, with 12.1 g. of chlorsulfonic acid, and neutralized with aqueous sodium hydroxide to give a foamy, soapy solution which, when dried, gave a white, waxy mass suitable as a dispersing agent.

*Example 3*

A mixture consisting of 100 g. of β-phenoxy-β'-chlorodiethyl ether, 134 g. of oleyl alcohol and 30.8 g. of potassium hydroxide was heated with stirring under reflux for 15 hours at 190 to 220° C. After filtering off the precipitate, the filtrate was distilled in vacuo. The oil, boiling at 210-240° C./0.1 mm., was collected as the desired product of the probable formula:

C₆H₅—O—CH₂CH₂—O—CH₂—CH₂—O—
    CH₂—(CH₂)₇—CH=CH—(CH₂)₇—CH₃

A solution of 86 g. of the above product in 50 g. of ethylene dichloride was sulfonated at 5 to 10° C. with 46.4 g. of chlorsulfonic acid for 4 hours. The product was neutralized with potassium hydroxide solution and evaporated to dryness in vacuo. Product was a water-soluble, waxy mass useful as an emulsifying agent.

The analogous compound made from cetyl alcohol, namely:

C₆H₅—O—CH₂CH₂—O—CH₂CH₂—O—C₁₆H₃₃ gave a similar product upon sulfonation.

*Example 4*

A mixture consisting of 135.5 g. of lauryl phenol, 90.5 g. of β-butoxy-β'-chlorodiethyl ether, 20.5 g. of sodium hydroxide, 50 g. of ethyl alcohol and 10 g. of water was boiled under reflux for 10 hours with vigorous agitation. When cool, the product was filtered and the filtrate was distilled under reduced pressure. The desired product, β-(laurylphenoxy-)-β'-butoxy diethyl ether.

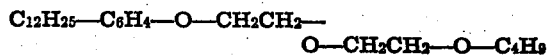

distilled over at 212-220° C./4 mm. as a colorless oil. Yield 85%.

40.6 g. of this product was treated at 5° C. with 20.6 g. of 98% sulfuric acid for several hours and finally heated 3 hours at 70° C. The reaction mixture was then neutralized with dilute potassium hydroxide solution and evaporated to dryness. This sulfonated product formed a pasty mass having powerful emulsifying properties in aqueous solution.

*Example 5*

A mixture consisting of 103 g. of p-α, α, γ, γ-tetramethyl-butylphenol, 90.5 g. of β-butoxy-β'-chlorodiethyl ether, 20.5 g. of sodium hydroxide, 50 g. of ethyl alcohol, and 10 cc. of water was boiled under reflux with stirring for 12 hours at 90° C. The product, when cool, was filtered, and the filtrate distilled under reduced pressure. The fraction boiling at 205-210° C./4 mm. came over as a colorless oil having the formula

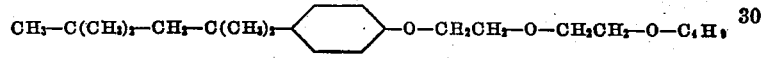

35 g. of the above ether was sulfonated with 20.6 g. of 98% sulfuric acid at 50 to 60° C. until the product became soluble in water (3 hours). The material obtained was then neutralized with potassium hydroxide. An aqueous solution of this sulfonate is useful as a dispersing agent for dyes.

*Example 6*

A mixture consisting of 85 g. of p-phenylphenol, 91 g. of β-butoxy-β'-chlorodiethyl ether, 20.5 g. of caustic soda, 50 g. of ethyl alcohol, and 10 cc. of water was heated with agitation under reflux at 90° C. for 12 hours. The material was cooled, filtered, and the filtrate distilled. The product, boiling at 227-232° C./4 mm. is butoxy-ethoxy-ethoxy-diphenyl, having the probable formula

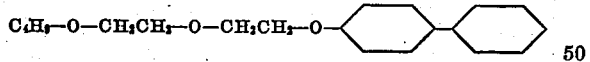

Upon sulfonation by heating with 1 mol equivalent of chlorsulfonic acid at 50° C., a water-soluble capillary-active sulfonic acid is obtained having useful properties as a wetting agent.

*Example 7*

A mixture consisting of 88 g. of p-cyclohexylphenol, 90.5 g. of β-butoxy-β'-chlorodiethyl ether, 20.5 g. of caustic soda, 50 g. of butanol, and 10 cc. of water was boiled under reflux for 12 hours. The material was cooled, filtered, and the filtrate distilled. The product, boiling at 210-215° C./5 mm., weighed 125 g., and is butoxyethoxyethoxyphenylcyclohexane, having the probable formula

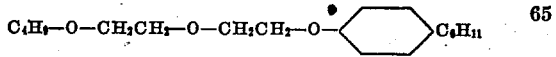

Upon sulfonation with concentrated sulfuric acid at 60 to 70° C., a water-soluble capillary-active sulfonate is obtained which, in the form of its ammonium salt, is useful as a dispersing agent.

*Example 8*

A mixture consisting of 90.5 g. of β-butoxy-β'-chlorodiethyl ether, 72 g. of β-naphthol, 20.5 g.

of caustic soda, 50 g. of butanol, and 10 cc. of water was boiled for 12 hours under reflux. The cooled, filtered product was distilled in vacuo. 72 g. of β-butoxy-ethoxyethoxynaphthalene, boiling at 221-230° C./5 mm. was obtained, having the formula

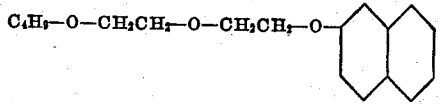

Upon sulfonation with 1 mol equivalent of chlorsulfonic acid at 50 to 60° C., a water-soluble sulfonate, useful in the form of its sodium salt as a dispersing agent for pigments, is obtained.

Example 9

A mixture consisting of 103 g. of p-ter.octyl-phenol (made by condensing diisobutylene and phenol), 54 g. of β-chlorodiethyl ether, 20.5 g. of caustic soda, 50 g. of butanol, and 10 cc. of water was boiled under reflux for 10 hours. The cooled, filtered product yielded, upon distillation, 70 g. of the ether having the formula

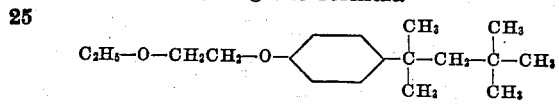

boiling at 155-157° C./2 mm. as a colorless oil. This compound was sulfonated with excess concentrated sulfuric acid at 50 to 60° C. yielding a water-soluble capillary-active sulfonate useful as a wetting agent.

Example 10

The compound $C_6H_5-O-CH_2CH_2-O-CH_2-CH_2-O-C_{10}H_{17}$ (B.P. 185-195° C./3 mm. made by condensing borneol in the presence of caustic soda with β-phenoxy-β'-chlorodiethyl ether was sulfonated at 50° C. with excess 98% sulfuric acid, and the product neutralized with potassium hydroxide. The water-soluble potassium sulfonate thus obtained is useful as a wetting-out agent for cotton.

Example 11

A mixture, consisting of 178 g. of p-α,α,γ,γ-tetramethyl-butylphenoxy-ethoxyethoxyethyl chloride
$C_8H_{17}-C_6H_4-O-CH_2CH_2-O$
$-CH_2CH_2-O-CH_2CH_2Cl$ 21 g. of sodium hydroxide, and 81 g. of diethylene glycol monobutyl ether, was heated with stirring for 10 hours at 180 to 210° C., under reflux. The reaction product was washed and fractionally distilled in vacuo. The product

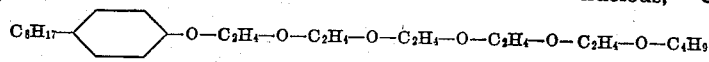

came over at 262-280° C./3 mm. as a pale yellow oil, which upon redistillation boiled at 260-265° C./3 mm. Upon sulfonation with concentrated sulfuric acid at 50 to 60° C., it yielded a water-soluble sulfonic acid which, after neutralization with diethanolamine, formed a good dispersing agent for pigments.

Example 12

A mixture consisting of 68 g. of p-α,α,γ,γ-tetramethylbutylphenoxyisopropoxy - isoproply chloride,

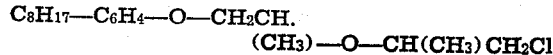

324 g. of diethylene glycol monobutyl ether, and 11.7 g. of potassium hydroxide was heated under reflux with stirring for 10 hours at 230 to 240° C. The reaction product was washed and distilled in vacuo. The product

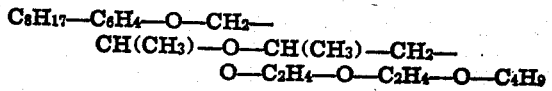

distilled over at 235 to 240° C./2 mm. as a pale yellow oil.

Upon sulfonation with chlorsulfonic acid at 30 to 40° C., it yielded a water-soluble sulfonic acid, the potassium salt of which is useful as a dispersing agent for clay.

The compounds of the type described herein may be used as assistants in dyeing, mercerizing, washing, laundering, desizing and sizing operations; in the preparation of emulsions for spinning and throwing oils, cutting oils, insecticides, finishing compounds containing waxes and oils; for dispersing pigments and dyes for rubber, inks and leather finishes; in cleaning operations for windows, floors, walls; removing residues of insecticide sprays from fruit, de-inking of newsprint, removing dust from the air in air-conditioning systems; in plating baths for deposition of nickel, tin, chromium, cadmium and other metals to give bright deposits and prevent pinholeing; as wetting or spreading agents for insecticides, parasiticides, fungicides, and pest repellents on plants, animals, fabrics, wood; for increasing the absorptive power of paper towels and cotton; and for breaking petroleum emulsions. It has also been found that these compounds have a definite fungicidal and bactericidal action.

Aromatic polyalkylene ethers, which on sulfonation yield the capillary-active materials described herein, are the subject matter of application Serial No. 204,307 filed on even date herewith.

I claim:

1. Compounds, which in the acid form have the general formula

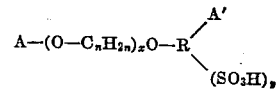

in which A represents a member of the group consisting of aliphatic and cycloaliphatic hydrocarbon radicals, A' represents a member of the group consisting of hydrogen, aliphatic, cycloaliphatic, aryl and arylaliphatic hydrocarbon radicals, the sum of the aliphatic carbon atoms in A and A' being at least four, R is an aromatic nucleus, $-C_nH_{2n}-$ is an alkylene group containing from two to five carbon atoms inclusive, $x$ is an integer from 1 to 5 inclusive and $y$ is one of the integers 1 and 2.

2. Compounds, which in the acid form have the general formula

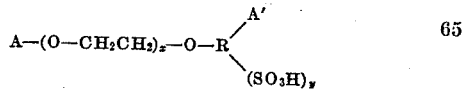

in which A represents a member of the group consisting of aliphatic and cycloaliphatic hydrocarbon radicals, A' represents a member of the group consisting of hydrogen, aliphatic, cycloaliphatic, aryl and arylaliphatic hydrocarbon radicals, the sum of the aliphatic carbon atoms in A and A' being at least four, R is an aromatic nucleus, $x$ is an integer from 1 to 5 inclusive and $y$ is one of the integers 1 and 2.

3. Compounds, which in the acid form have the general formula

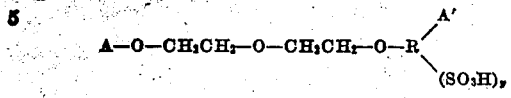

in which A represents a member of the group consisting of aliphatic and cycloaliphatic hydrocarbon radicals, A' represents a member of the group consisting of hydrogen, aliphatic, cycloaliphatic, aryl and arylaliphatic hydrocarbon radicals, the sum of the aliphatic carbon atoms in A and A' being at least four, R is an aromatic necleus and $y$ is one of the integers 1 and 2.

4. Compounds, which in the acid form have the general formula

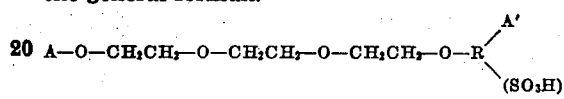

in which A represents a member of the group consisting of aliphatic and cycloaliphatic hydrocarbon radicals, A' represents a member of the group consisting of hydrogen, aliphatic, cycloaliphatic, aryl and arylaliphatic hydrocarbon radicals, the sum of the aliphatic carbon atoms in A and A' being at least four, R is an aromatic nucleus and $y$ is one of the integers 1 and 2.

5. Compounds, which in the acid form have the general formula $$A-(O-CH_2CH_2)_x-O-R-SO_3H$$

in which A is an aliphatic hydrocarbon radical containing at least four carbon atoms, $x$ is an integer of from 1 to 5 inclusive and R is a benzene nucleus.

6. Lauryloxy-ethoxy-ethoxy-ethoxyphenyl sulfonic acid $$C_{12}H_{25}-O-C_2H_4-O-C_2H_4-O-C_2H_4-O-C_6H_4-SO_3H$$

7. Oleyloxy-ethoxy-ethoxy-phenyl sulfonic acid $$C_{18}H_{35}-O-CH_2CH_2-O-CH_2CH_2-O-C_6H_4SO_3H$$

8. Cetyloxy-ethoxy-ethoxyphenyl sulfonic acid $$C_{16}H_{33}-O-CH_2CH_2-O-CH_2CH_2-O-C_6H_4SO_3H$$

9. The process for producing compounds of the general formula

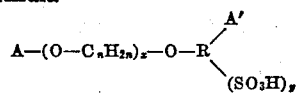

in which A represents a member of the group consisting of aliphatic and cycloaliphatic hydrocarbon radicals, A' represents a member of the group consisting of hydrogen, aliphatic, cycloaliphatic, aryl and arylaliphatic hydrocarbon radicals, the sum of the aliphatic carbon atoms in A and A' being at least four, R is an aromatic nucleus, $-C_nH_{2n}-$ is an alkylene group containing from two to five carbon atoms inclusive, $x$ is an integer from 1 to 5 inclusive and $y$ is one of the integers 1 and 2, which comprises treating an aromatic ether of the general formula $$A-(O-C_nH_{2n})_x-O-R-A'$$

with a sulfonating agent.

10. The process for producing compounds of the general formula

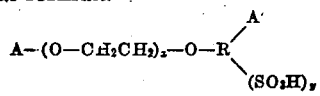

in which A represents a member of the group consisting of aliphatic and cycloaliphatic hydrocarbon radicals, A' represents a member of the group consisting of hydrogen, aliphatic, cycloaliphatic, aryl and arylaliphatic hydrocarbon radicals, the sum of the aliphatic carbon atoms in A and A' being at least four, R is an aromatic nucleus, $x$ is an integer from 1 to 5 inclusive and $y$ is one of the integers 1 and 2, which comprises treating an aromatic ether of the general formula $$A-(O-C_nH_{2n})_x-O-R-A'$$

with a sulfonating agent.

11. The process for producing compounds of the general formula

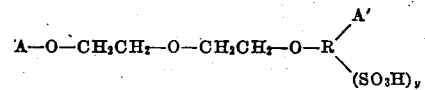

in which A represents a member of the group consisting of aliphatic and cycloaliphatic hydrocarbon radicals, A' represents a member of the group consisting of hydrogen, aliphatic, cycloaliphatic, aryl and arylaliphatic hydrocarbon radicals, the sum of the aliphatic carbon atoms in A and A' being at least four, R is an aromatic nucleus, and $y$ is one of the integers 1 and 2, which comprises treating an aromatic ether of the general formula $$A-O-CH_2CH_2-O-CH_2CH_2-O-R-A'$$

with a sulfonating agent.

12. The process for producing compounds of the general formula

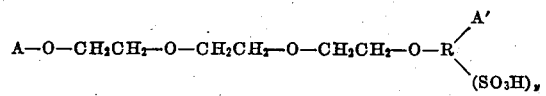

in which A represents a member of the group consisting of aliphatic and cycloaliphatic hydrocarbon radicals, A' represents a member of the group consisting of hydrogen, aliphatic, cycloaliphatic, aryl and arylaliphatic hydrocarbon radicals, the sum of the aliphatic carbon atoms in A and A' being at least four, R is an aromatic nucleus, and $y$ is one of the integers 1 and 2, which comprises treating an aromatic ether of the general formula $$A-O-CH_2CH_2-O-CH_2CH_2-O-CH_2CH_2-O-R-A'$$

with a sulfonating agent.

13. The process for producing compounds of the general formula $$A-(O-CH_2CH_2)_x-O-R-SO_3H$$

in which A is an aliphatic hydrocarbon radical containing at least four carbon atoms, $x$ is an integer of from 1 to 5 inclusive and R is a benzene nucleus, which comprises treating an aromatic ether of the general formula $$A-(O-CH_2CH_2)_x-O-R$$

with a sulfonating agent.

14. The process which comprises treating lauryloxy-ethoxyethoxy-ethoxy benzene with a sulfonating agent.

15. The process which comprises treating oleyloxy-ethoxyethoxy benzene with a sulfonating agent.

16. The process which comprises treating cetyloxy-ethoxyethoxy benzene with a sulfonating agent.

HERMAN A. BRUSON.